United States Patent
Liljenstolpe et al.

(10) Patent No.: US 9,042,234 B1
(45) Date of Patent: May 26, 2015

(54) SYSTEMS AND METHODS FOR EFFICIENT NETWORK TRAFFIC FORWARDING

(71) Applicant: Big Switch Networks, Inc., Palo Alto, CA (US)

(72) Inventors: Christopher D. Liljenstolpe, San Francisco, CA (US); Saurav Das, Palo Alto, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 101 days.

(21) Appl. No.: 13/665,736

(22) Filed: Oct. 31, 2012

(51) Int. Cl.
*H04L 12/721* (2013.01)
*H04L 12/801* (2013.01)

(52) U.S. Cl.
CPC .............. *H04L 45/72* (2013.01); *H04L 47/12* (2013.01)

(58) Field of Classification Search
None
See application file for complete search history.

(56) References Cited

U.S. PATENT DOCUMENTS

| | | | | |
|---|---|---|---|---|
| 5,042,027 | A * | 8/1991 | Takase et al. | 370/252 |
| 6,760,314 | B1 * | 7/2004 | Iwata | 370/254 |
| 7,068,624 | B1 * | 6/2006 | Dantu et al. | 370/331 |
| 7,580,360 | B2 * | 8/2009 | Bryant et al. | 370/238 |
| 7,746,793 | B2 | 6/2010 | Nadeau et al. | |
| 7,813,281 | B2 | 10/2010 | Bolt et al. | |
| 8,208,371 | B2 * | 6/2012 | Li et al. | 370/217 |
| 8,264,983 | B2 * | 9/2012 | Cortez et al. | 370/254 |
| 8,296,459 | B1 * | 10/2012 | Brandwine et al. | 709/241 |
| 2005/0246347 | A1 * | 11/2005 | Kobayashi | 707/10 |
| 2011/0255418 | A1 * | 10/2011 | Van Greunen et al. | 370/242 |
| 2011/0261722 | A1 * | 10/2011 | Awano | 370/254 |
| 2012/0023231 | A1 * | 1/2012 | Ueno | 709/225 |
| 2012/0087377 | A1 * | 4/2012 | Lai | 370/427 |

OTHER PUBLICATIONS

Swierk et al., U.S. Appl. No. 13/088,262, filed Apr. 15, 2011.
Katz et al. "Traffic Engineering (TE) Extensions to OSPF Version 2," The Internet Society, Sep. 2003 (13 pages) [Retrieved on Jan. 23, 2013]. Retrieved from the Internet:<http://tools.ietf.org/rfc/rfc3630.txt>.
Awduche et al. "RSVP-TE: Extensions to RSVP for LSP Tunnels," The Internet Society, Dec. 2001 (59 pages) [Retrieved on Jan. 23, 2013]. Retrieved from the Internet:<http://www.ietf.org/rfc/rfc3209.txt>.

* cited by examiner

*Primary Examiner* — Hong Cho
(74) *Attorney, Agent, or Firm* — Treyz Law Group; Chih-Yun Wu; Michael H. Lyons

(57) ABSTRACT

A network may include a core region having routers and peripheral regions coupled to the core regions. Switches controlled by a controller may be interposed between the routers. The controller may maintain network topology information of the network. A path computation module may identify forwarding paths between the network routers based on the network topology information and other information such as network traffic history, current network traffic conditions, future network traffic forecasts, or other desired network information. The controller may control the switches to implement the identified forwarding paths. The controller may detect network topology changes and update forwarding paths based on the detected network topology changes. The controller may determine weights of path segments of the network topology. A routing module may provide the path segment weights to the routers using a network protocol.

9 Claims, 17 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
| --- | --- | --- | --- | --- | --- | --- | --- |
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

| SOURCE ETHERNET ADDRESS | DESTINATION ETHERNET ADDRESS | PRIORITY | ... | ACTION |
|---|---|---|---|---|
| * | ADR_CR1 | 2 | | SEND TO PORT P1 |
| ADR_CR1 | ADR_CR5 | 2 | | SEND TO PORT P2 |
| ADR_CR4 | ADR_CR5 | 2 | | SEND TO PORT P1 |
| ADR_CR4 | ADR_CR5 | 1 | | SEND TO PORT P2 |

FIG. 9

SYSTEMS AND METHODS FOR EFFICIENT NETWORK TRAFFIC FORWARDING

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Networks such as those that comprise the Internet typically have core portions including core routers and aggregation routers that serve to route network traffic between peripheral portions of the networks. The peripheral portions of a network include smaller networks to which end hosts are connected. Core routers and aggregation routers often are required to handle large volumes of network traffic that are generated by the peripheral portions of the network. For example, a given core router may be required to handle network traffic from hundreds, thousands, or more end hosts of the peripheral portions of the network. The core routers and aggregation routers are often implemented on expensive and complex network equipment in order to provide sufficient processing and switching capabilities for routing large volumes of network traffic. It may also be challenging for the core routers to make optimal routing decisions, because each core router may have a limited view of the entire network. It may therefore be desirable to provide networks with improved routing capabilities.

SUMMARY

A network may include a core region having routers such as core routers and aggregation routers. Peripheral regions of the network may be connected to the core regions at aggregation routers. The peripheral regions may correspond to respective geographical regions. Switches may be interposed between the routers. A controller such as a centralized controller server or a distributed controller may be used to control the switches.

The controller may maintain network topology information of the network. A path computation module may identify forwarding paths between the network routers based on the network topology information and other information such as network traffic history, current network traffic conditions, future network traffic forecasts, or other desired network information. Each forwarding path may include one or more switches. The path computation module may be implemented at the controller or implemented at separate computing equipment that communicates with the controller. The controller may control the switches to implement the identified forwarding paths (e.g., by providing flow table entries to the switches).

The controller may detect network topology changes. The path computation module may update forwarding paths based on the detected network topology changes. Invalidated forwarding paths may be disabled at selected switches of each invalidated forwarding path.

Routers may share routing information with other routers. The routing information may be shared using a network protocol such as the Open Shortest Path First (OSPF) or Border Gateway 4 (BGP4) protocols. The routers may use shared routing information in determining how to route network packets between peripheral portions of the network. The controller may determine weights of path segments of the network topology. A routing module may provide the path segment weights to the routers using the network protocol. The path segment weights may be used by the routers in determining how to route the network packets. The routing module may be implemented at the controller or at one or more route servers.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 9 is a diagram of an illustrative flow table including entries that may be provided to a switch by a controller for implementing forwarding paths between routers in a network in accordance with an embodiment of the present invention.

DETAILED DESCRIPTION

Networks such as those that comprise the Internet and the local and regional networks that are coupled to the Internet rely on packet-based switches. These switches, which are sometimes referred to herein as network switches, packet processing systems, or packet forwarding systems can forward packets based on address information. The switches may include electrical or optical switches (e.g., switches that transmit data using light). As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
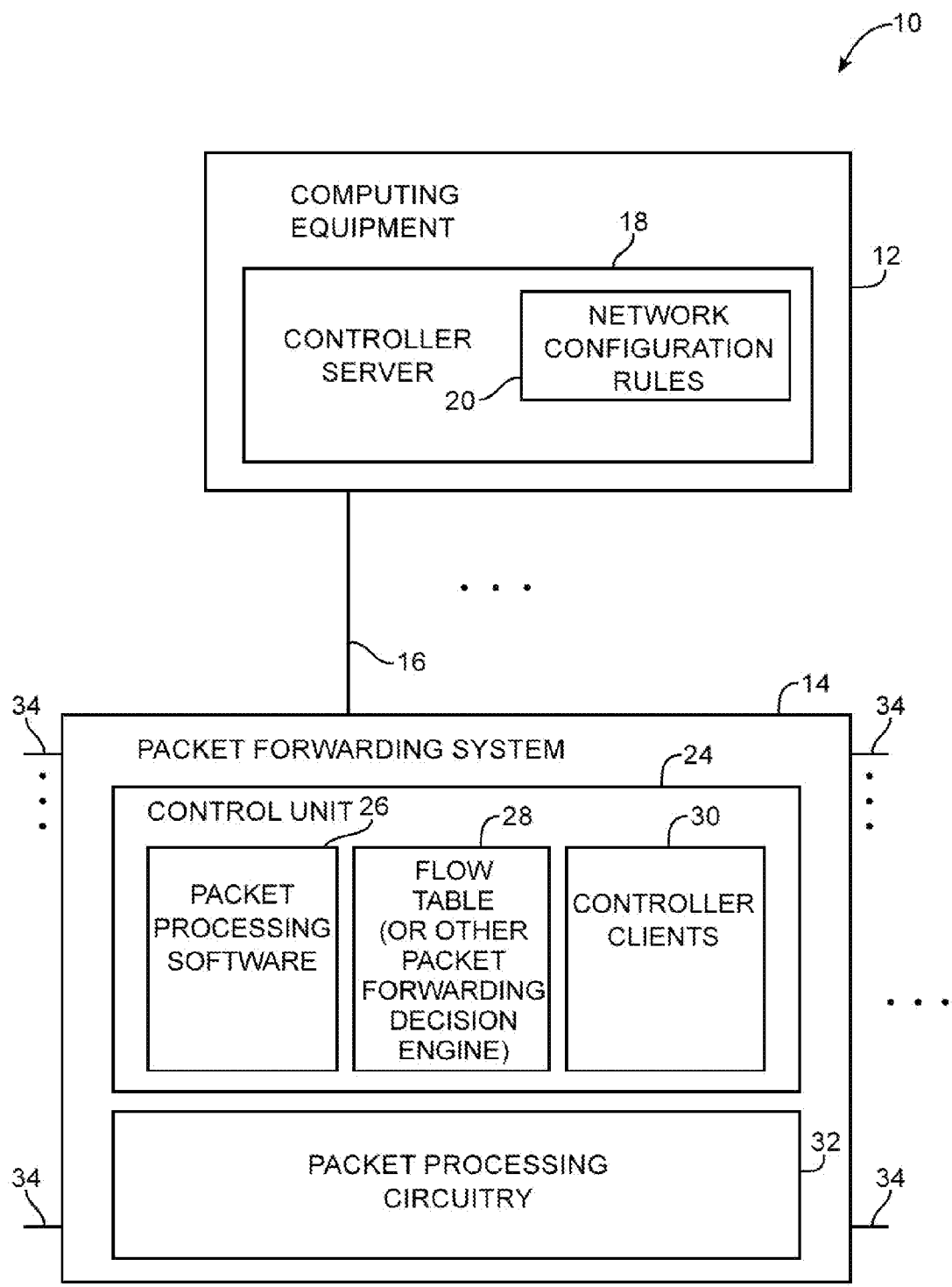
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets or other probe packets (e.g., probe packets using any desired discovery protocol) through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
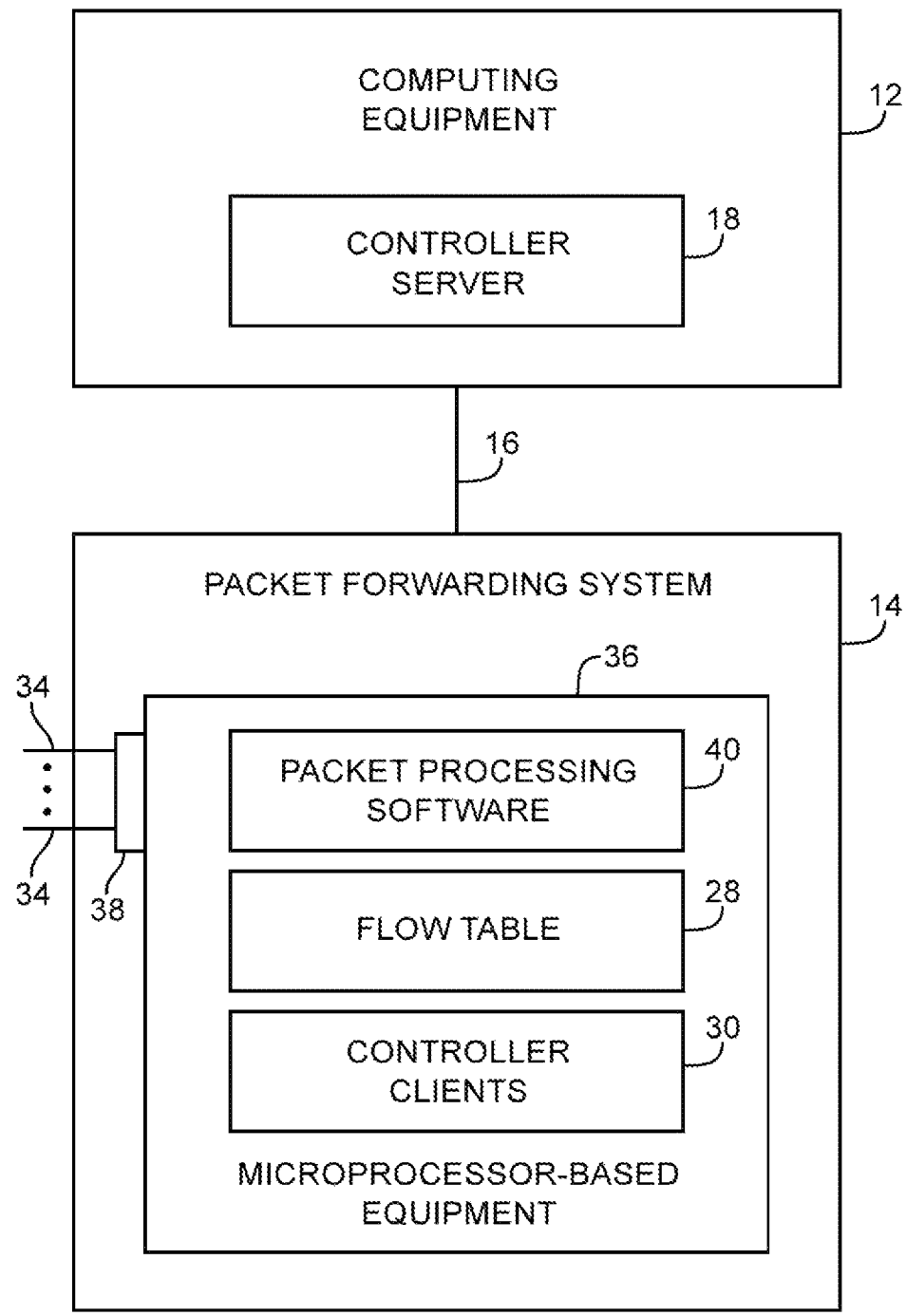
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Switches such as switch 14 of FIG. 2 may sometimes be referred to as software switches, because the switches use control software that is implemented on computing equipment to process packets. Multiple software switches can be implemented using different equipment computing equipment or as independently operating software switches on the same computing equipment. In some scenarios, hardware virtualization may allow for multiple end hosts to be implemented on computing equipment such as a computer, laptop, etc. For example, a hypervisor module implemented as dedicated circuitry or using general purpose circuitry (e.g., microprocessor-based equipment 36) on a computer or other computing equipment may accommodate simultaneous operation of multiple operating systems that serve as end hosts (e.g., packet sources and packet destinations). In this scenario, the operating systems may be referred to as virtual machines or virtual end hosts. A software switch 14 implemented on the computer (e.g., as part of the hypervisor module) may provide network connectivity for each of the virtual end hosts.

If desired, virtual switches may be formed using a controller such as controller server 18. In this scenario, the controller may configure switches 14 in a network to perform switching operations as if multiple switches 14 form a single software switch. For example, a virtual switch may be formed from a group of end hosts or a group of switch interfaces (e.g., a subset of the ports of switches 14). The controller may configure underlying switches 14 that are coupled to the group of end hosts so that the underlying switches 14 have characteristics of a single switch.

Figure 3:
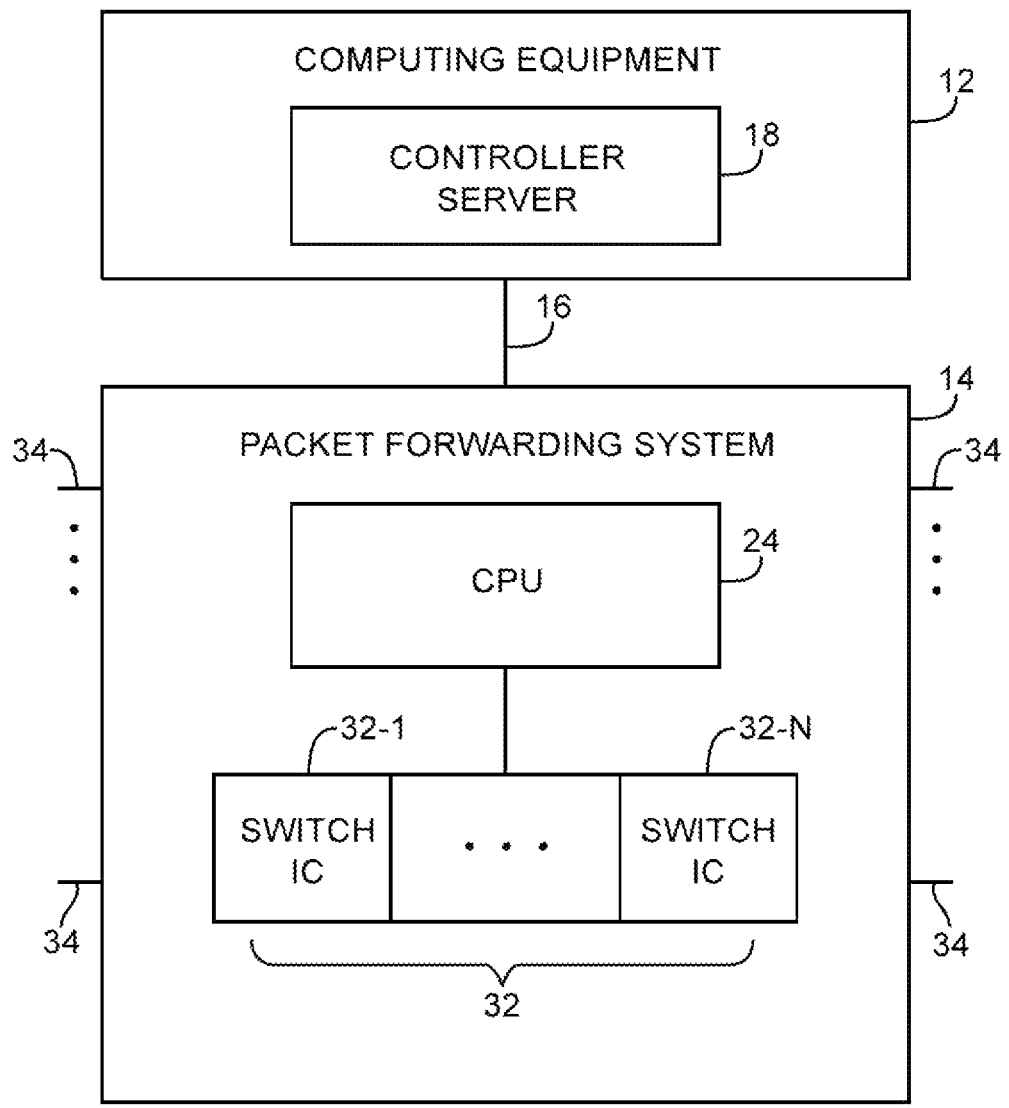
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
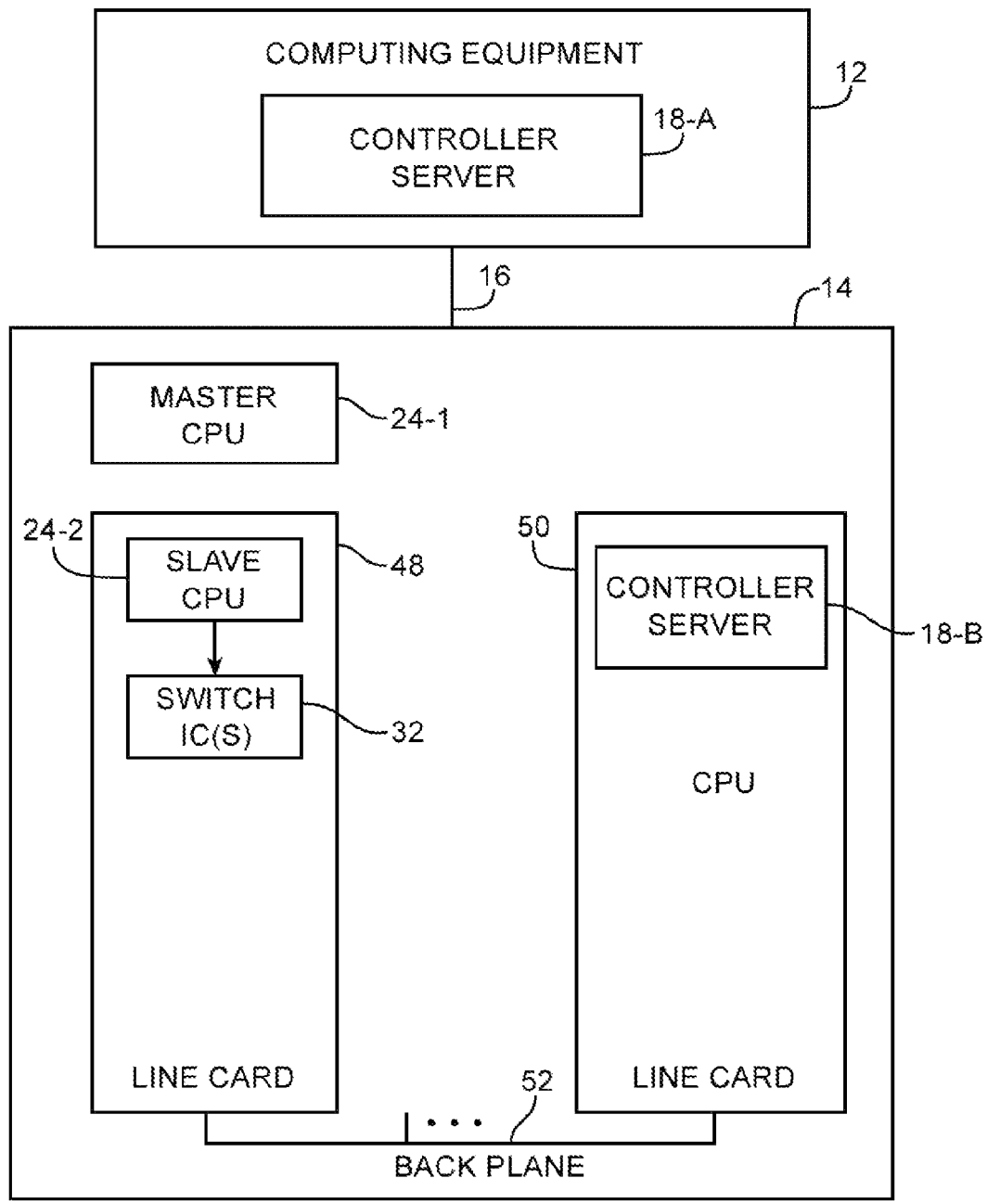
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
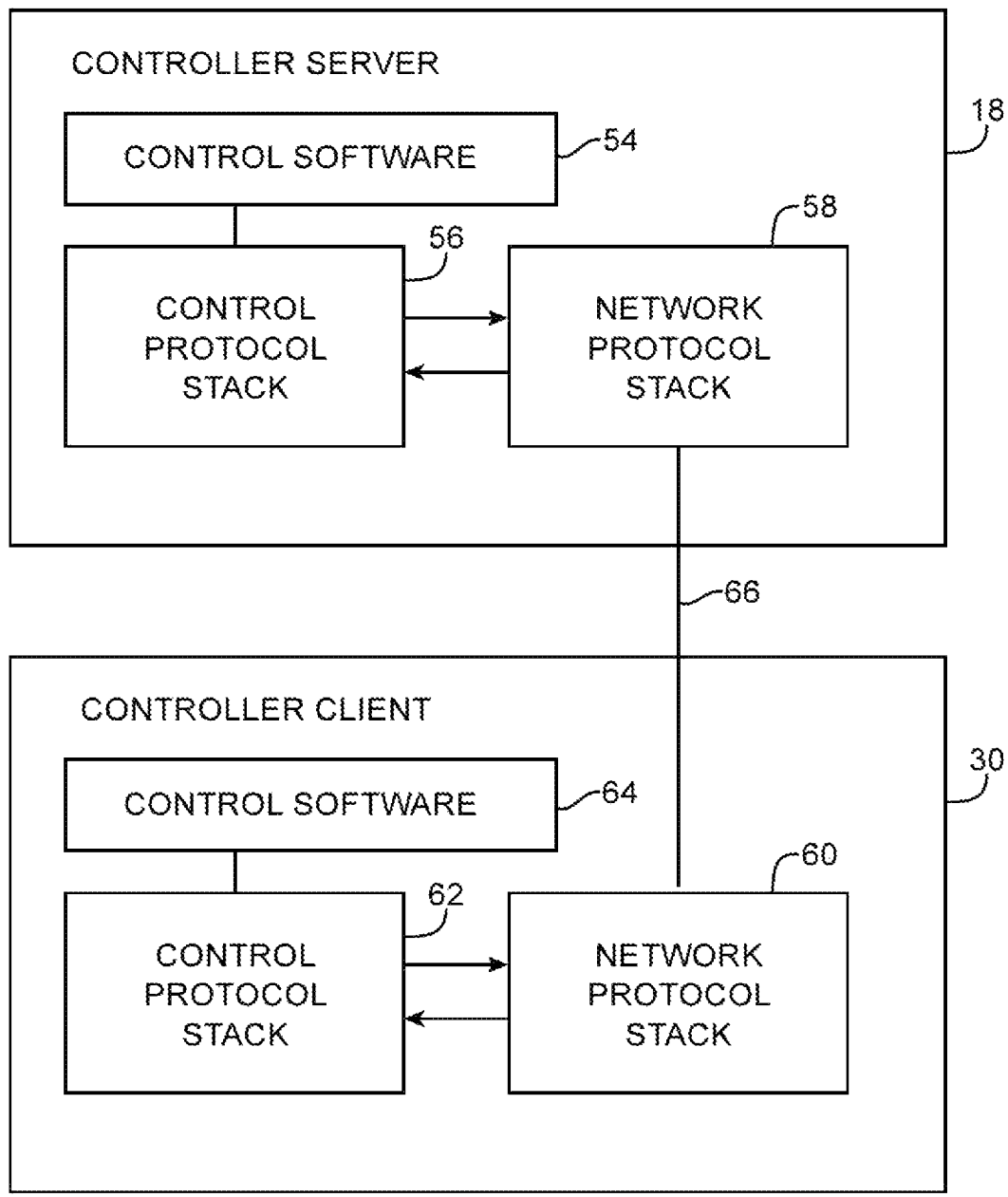
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
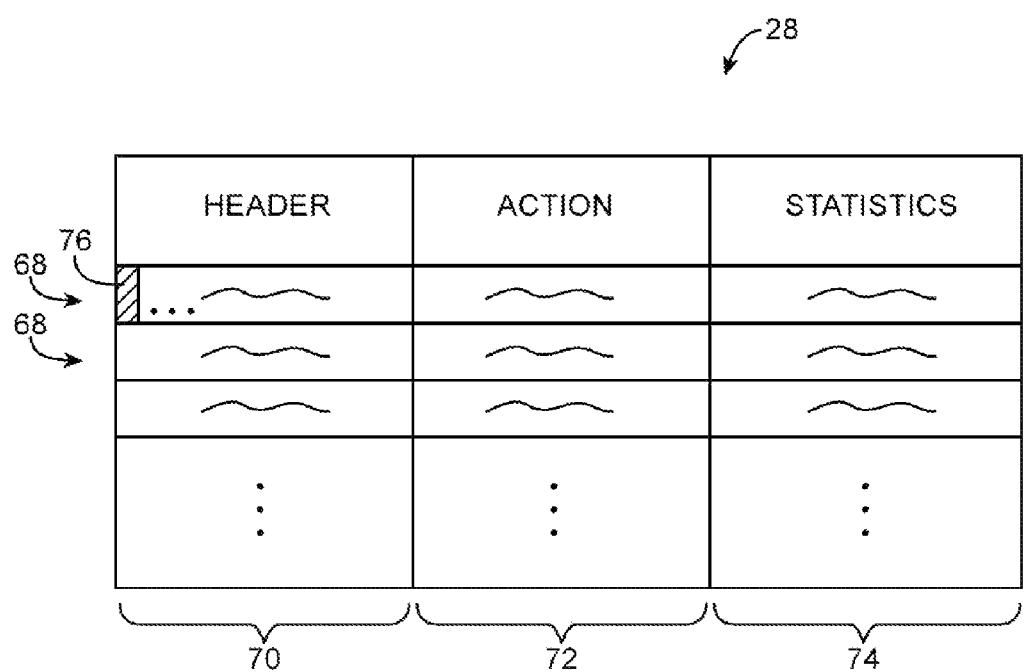
FIG. 6A is a diagram of an illustrative flow table of the type that may be used by a packet processing system in accordance with an embodiment of the present invention.

An illustrative flow table is shown in FIG. 6A. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
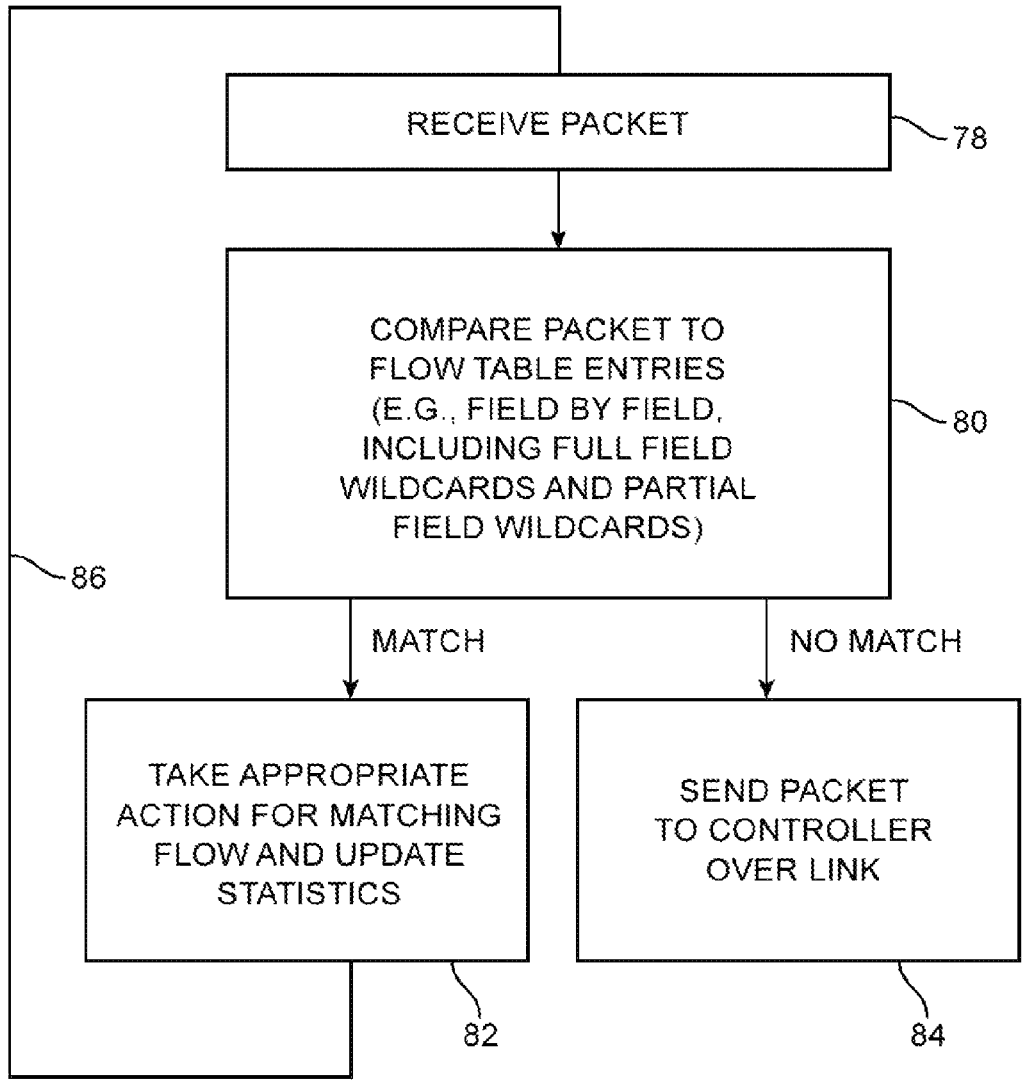
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84). The packet may be sent to controller server 18 as part of a "packet in" message that may include additional information such as information identifying the switch and a switch port at which the packet was received.

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Networks such as those that comprise the Internet often include many network devices such as end hosts and switches or other packet forwarding systems. Packet forwarding systems may sometimes route network traffic based on a network protocol such as the Internet Protocol (e.g., IPv4 or IPv6). In these scenarios, the packet forwarding systems may be referred to as routers. A network may include tens, thousands, millions, or more network devices. It can be challenging to efficiently route network traffic in networks having many network devices. For example, routers may have limited capacity for storing routing information. Routers with increased capacity may be costly and therefore impractical for use throughout the network.

A network with many network devices may be organized into a hierarchical structure having a core portion with core routers and aggregation routers that serve to route network traffic between peripheral portions of the network. Each peripheral portion of the network may be served by a respective aggregation router.

Core routers may be formed from packet forwarding systems such as rack-based systems having increased performance compared to aggregation routers or routers in the peripheral portions of the network. The core routers may have increased switching performance, routing information capacity, and may be able to handle network traffic from multiple portions of the network (e.g., the portions of the network served by multiple aggregation switches and edge switches).

A network of switches that are controlled by a controller may be interposed in the network between routers such as core routers and aggregation routers. An illustrative network 100 that includes a controller 18 is shown in FIG. 8.

Figure 8:
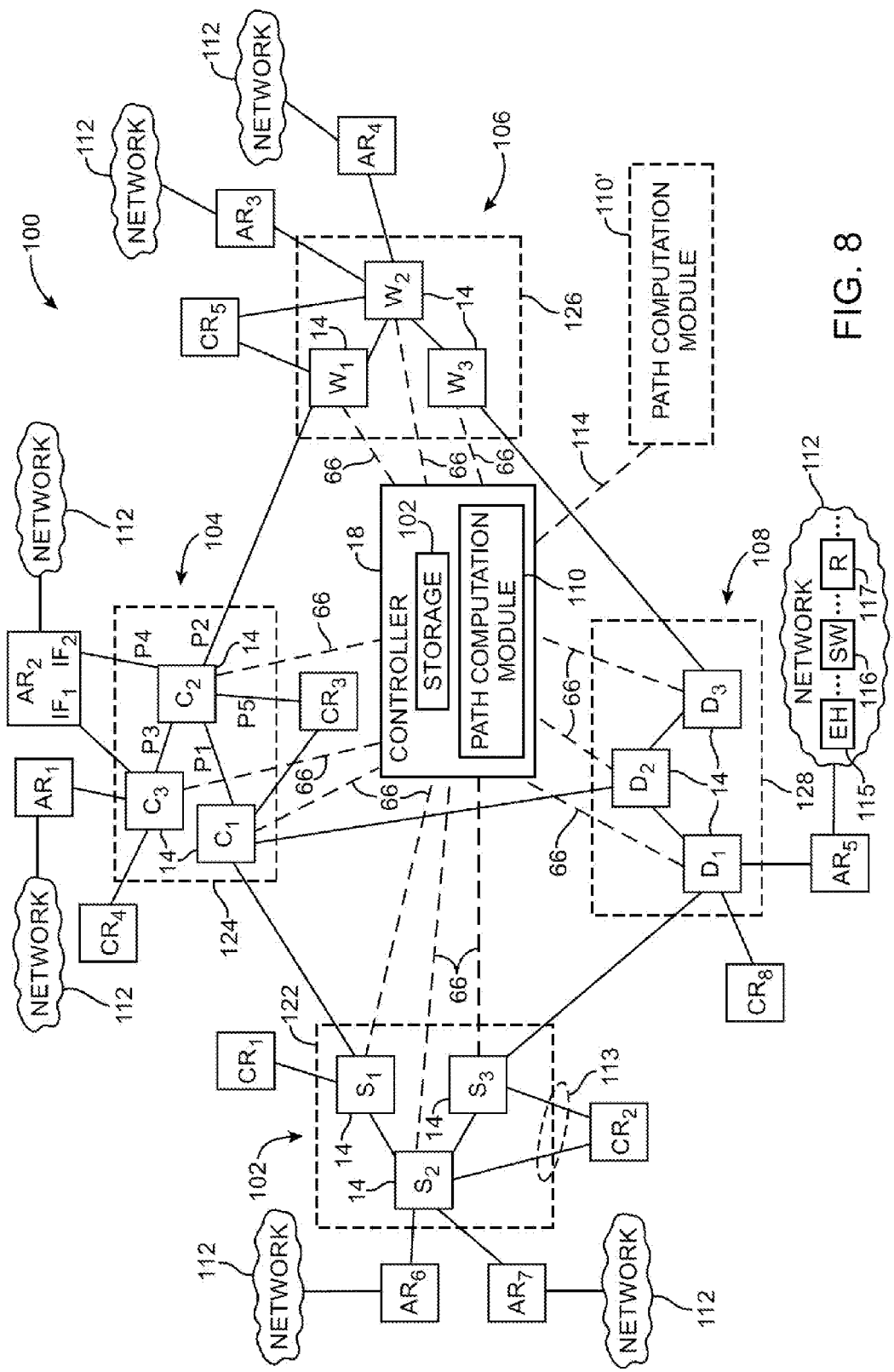
FIG. 8 is a diagram of an illustrative network that includes a core portion having routers and switches that are interposed between the routers and controlled by a controller in accordance with an embodiment of the present invention.

As shown in FIG. 8, network 100 may include switches 14 that communicate with controller 18 via control paths 66 (e.g., switches S1, S2, S3, C1, D1, W1, etc.). In general, switches 14 may be any packet forwarding systems that are controlled by controller 18 (e.g., packet forwarding systems that include controller clients). Switches 14 that are controlled by controller 18 may include controller clients that communicate with controller 18 and may sometimes be referred to as client switches. Control paths 66 may include additional switches or other network devices that forward network control packets between controller 18 and the client switches.

Packet forwarding systems in network 100 that do not communicate with controller 18 via control paths 66 (e.g., because the packet forwarding systems do not include controller clients) may be referred to as non-client packet forwarding systems. The non-client packet forwarding systems may operate independently from controller 18. As an example, core routers CR1, CR2, CR3, CR4, and CR5 and aggregation routers AR1, AR2, and AR3 may be referred to as non-client packet forwarding systems.

Switches and other packet forwarding systems in network 100 may have ports that are coupled to network devices (elements) such as other switches, end hosts, or other desired network devices. In the example of FIG. 8, client switch C2 may include ports P1, P2, P3, P4, and P5. Ports P1, P2, P3, P4, and P5 may be coupled to corresponding ports of client switch C1, client switch W1, client switch C3, router AR2, and router CR3 respectively. Switches in network 100 may transmit and receive network packets at ports of the switches.

Network 100 may include a core portion that is coupled to peripheral portions such as networks 112. The core portion may include core routers such as core routers CR1, CR2, CR3, CR4, and CR5 and aggregation routers such as routers AR1, AR2, etc. The core routers may be organized so that groups of core routers serve different geographical regions. Geographical regions may include continents, countries, cities, or other geographical-based arrangements. Core routers CR1 and CR2 may serve a first region 102, core routers CR3 and CR4 may serve second region 104, core router CR5 may serve a third region 106, and core router CR8 may serve a fourth region 108.

Peripheral portions of network 100 such as networks 112 may include end hosts 115 that receive and transmit network packets to other end hosts (e.g., end hosts in networks 112). If desired, networks 112 may include additional switches 116 and routers 117. In some scenarios, switches 116 may be client switches that are controlled by one or more controllers such as controller 18. For example, additional controllers such as controller servers or distributed controllers (not shown) may serve to control switches 116 in peripheral portions of network 100.

Core routers may serve to direct network traffic flow between regions (e.g., the core routers may route network traffic between regions 102 and 104, between regions 106 and 108, etc.). Within each region, aggregation routers such as aggregation routers AR1, AR2, AR3, AR4, AR5, AR6, and AR7 may handle network traffic flow for respective peripheral regions 112 of the network.

Groups of client switches may be interposed between the non-client packet forwarding systems (e.g., core routers and aggregation routers) of each region. In the example of FIG. 8, client switch group 122 may be interposed between non-client switches of region 102, client switch group 124 may separate non-client switches of region 104, group 126 may separate non-client switches of region 106, and group 108 may separate non-client switches of region 108. Controller 18 may control the client switches of each group to forward network packets through network 100.

In some scenarios, routers may be coupled to multiple client switches, which may help provide increased bandwidth and failure tolerance. For example, core router CR2 may be simultaneously coupled to client switches S2 and S3. In this scenario, core router CR2 may simultaneously use the connections to client switches S2 and S3, effectively forming a single interface 113. If one of the connections fails, the remaining connection may serve to provide network connectivity without interruption in network communications. Scenarios in which two or more network connections (links) are logically combined to serve as a single interface may sometimes be referred to as multi-chassis link aggregation groups (MC-LAGs).

If desired, routers that operate using a network protocol such as the Internet Protocol may be configured with multiple network protocol interfaces and to balance network traffic between the network protocol interfaces. For example, ports of aggregate router AR2 that are coupled to client switches C3 and C2 may be configured as network protocol interfaces IF1 and IF2. In this scenario, interface IF1 may be assigned to a first set of Internet Protocol addresses, whereas interface IF2 may be assigned to a second set of Internet Protocol addresses. Network traffic matching the first set of Internet Protocol addresses may be forwarded and received at interface IF1, whereas network traffic matching the second set of Internet Protocol addresses may be accommodated at interface IF2. Router AR2 may route network traffic flow while balancing the network traffic flow between interfaces IF1 and IF2. Scenarios in which routers are configured to balance network traffic between multiple network protocol interfaces may sometimes be referred to as equal cost multipath routing (ECMP).

If desired, path computation module 110 may determine different forwarding paths for each network protocol interface of a router to further balance traffic load on the network. For example, path computation module 110 may identify a first forwarding path from interface IF1 to core router CR2 through client switches C3, C2, C1, S1, and S2 and a second forwarding path from interface IF2 to core router CR1 through client switches C2, C1, D2, D1, and S3. In this scenario, core router CR2 may be configured with network protocol interfaces that share attributes with the network protocol interfaces of aggregate router AR2. In other words, the set of Internet Protocol addresses associated with interface IF1 may be shared with a network protocol interface of router CR2 coupled to client switch S2, whereas the set of Internet Protocol addresses associated with interface IF2 may be shared with a network protocol interface of router CR2 that is coupled to client switch S3.

Controller 18 may maintain information that describes the topology of network 100. For example, controller 18 may communicate with client switches using packets such as link layer discover protocol (LLDP) packets to identify network connections between client switches in network 100. Controller 18 may monitor the client switches to identify changes in the network topology. For example, controller 18 may identify changes in the network topology based on network packets that are forwarded to controller 18 by the client switches. As another example, controller 18 may periodically communicate with the client switches to identify changes in the network connections between the client switches. The network topology information may be maintained in storage 102 at controller 18 or at remote storage equipment that communicates with controller 18 (not shown).

Controller 18 may include a path computation module 110 that determines network forwarding paths through the client switches for efficient use of network resources. Path computation module 110 may be formed as a part of controller 18 (e.g., as a dedicated processing circuit or as software implemented on general purpose processing circuitry). If desired, path computation module 110' may be formed separately from controller 18 (e.g., implemented on separate computing equipment). In this scenario, path computation module 110' may communicate with controller 18 over paths 114. Paths 114 may include network paths having one or more network switches or may be formed from any desired communications paths (e.g., a cable that directly connects controller 18 and path computation module 110').

Path computation module 110 may use network topology information to determine network forwarding paths through the client switches. For example, controller 18 may identify a forwarding path from core router CR1 to core router CR5 that traverses client switches S1, C1, C2, and W1. As another example, a forwarding path from CR1 to CR5 may include client switches S1, C1, D2, D3, W3, W2, and W1. Forwarding paths between two locations in network 100 may be determined based on metrics such as available bandwidth, latency, number of network links traversed, current network traffic conditions, or other desired metrics associated with cost of traversing the network paths.

If desired, historical network traffic information maintained at path computation module 110 may be used to estimate future network traffic conditions. For example, controller 18 may maintain statistical information that identifies how much network traffic traverses each pair of locations in a network. In this scenario, path computation module 110 may estimate how much traffic is expected to forwarded between a given pair of network locations based on the statistical information (e.g., regularly repeating time periods of peak network traffic between the pair of network locations may indicate when the next time period of peak network traffic will occur).

Path computation module 110 may determine network forwarding paths for efficient use of available network resources. Consider the scenario in which network traffic is initially forwarded along the shortest paths (e.g., paths having minimal number of switches). In this scenario, network traffic sent from region 122 to region 126 is forwarded via the network path including switches S1, C1, C2, and W1, whereas network traffic from region 124 to region 126 is forwarded via the network path including switches C2 and W1. However, the network traffic from region 122 to region 126 can potentially saturate network connections between the switches (e.g., the network traffic may exceed the available bandwidth between switches C2 and W1). When the network traffic from region 122 saturates the available bandwidth between switches C2 and W1, additional network traffic from region 124 may be delayed or dropped. In this scenario, controller 18 may control client switches in network 100 so that network traffic from region 124 is forwarded through an alternate path including client switches C1, D2, D3, and W3 (e.g., the alternative path may be identified by path computation module 110).

Controller 18 may implement network forwarding paths by providing flow table entries (e.g., flow table entries 68 of FIG. 6A). FIG. 9 is an illustrative flow table 130 including flow table entries that may be provided by controller 18 to implement network forwarding paths. In the example of FIG. 9, flow table 130 may correspond to client switch C2 (e.g., client switch C2 may forward network packets based on the entries of flow table 130). Each flow table entry may include a source Ethernet address field, a destination Ethernet address field, a priority field, and other fields (e.g., header fields of header 70 as shown in FIG. 6A). Each flow table entry may include a corresponding action to be performed by client switch C2 in response to matching a network packet to the fields of the flow table entry.

As shown in FIG. 9, flow table entry 132 may include a wildcarded source Ethernet address, Ethernet address ADR_CR1 of core router CR1, and have priority two. Client switch C2 may match network packets destined for core router CR1 to flow table entry 132 (e.g., network packets from any source Ethernet address that are destined for Ethernet address ADR_CR1). Flow table entry 132 may direct client switch C2 to forward matching network packets from port P1. In other words, flow table entry 132 may direct client switch C2 to forward network packets that are destined for core router CR1 from port P1 to client switch C1. Client switches C1 and S1 may similarly be provided with flow table entries (not shown) to implement a network forwarding path including client switches C2, C1, and S1.

Flow table entry 134 may direct client switch C2 to forward network packets that are received from core router CR1 and destined for core router CR5 from port P2. Flow table entry 134 may, for example, be provided to client switch C2 by controller 18 when implementing a forwarding path from core router CR1 to core router CR5 that includes client switches S1, C1, C2, and W1. Flow table entry 136 may be similarly provided for implementing a forwarding path from router CR4 to router CR5 that includes client switches C3, C2, and W1.

If desired, backup flow table entries may be provided that implement alternate forwarding paths. Flow table entry 138 is an illustrative flow table entry that may serve as a backup flow table entry for entry 136. As shown in FIG. 9, flow table entry 138 may be provided with a lower priority than flow table entry 136. During normal operation, client switch C2 may match network packets to flow table entries 136 and 138. However, flow table entry 136 may take priority over flow table entry 138 (e.g., the action of entry 136 may be performed for network packets that match both flow table entries 136 and 138). Controller 18 may control client switch C2 to implement the forwarding path associated with entry 138 by removing flow table entry 136. If desired, controller 18 may adjust the priority of flow table entry 138 to a higher priority than flow table entry 136 or replace flow table entry 138 with a substantially identical flow table entry having a higher priority than flow table entry 136.

Figure 10:
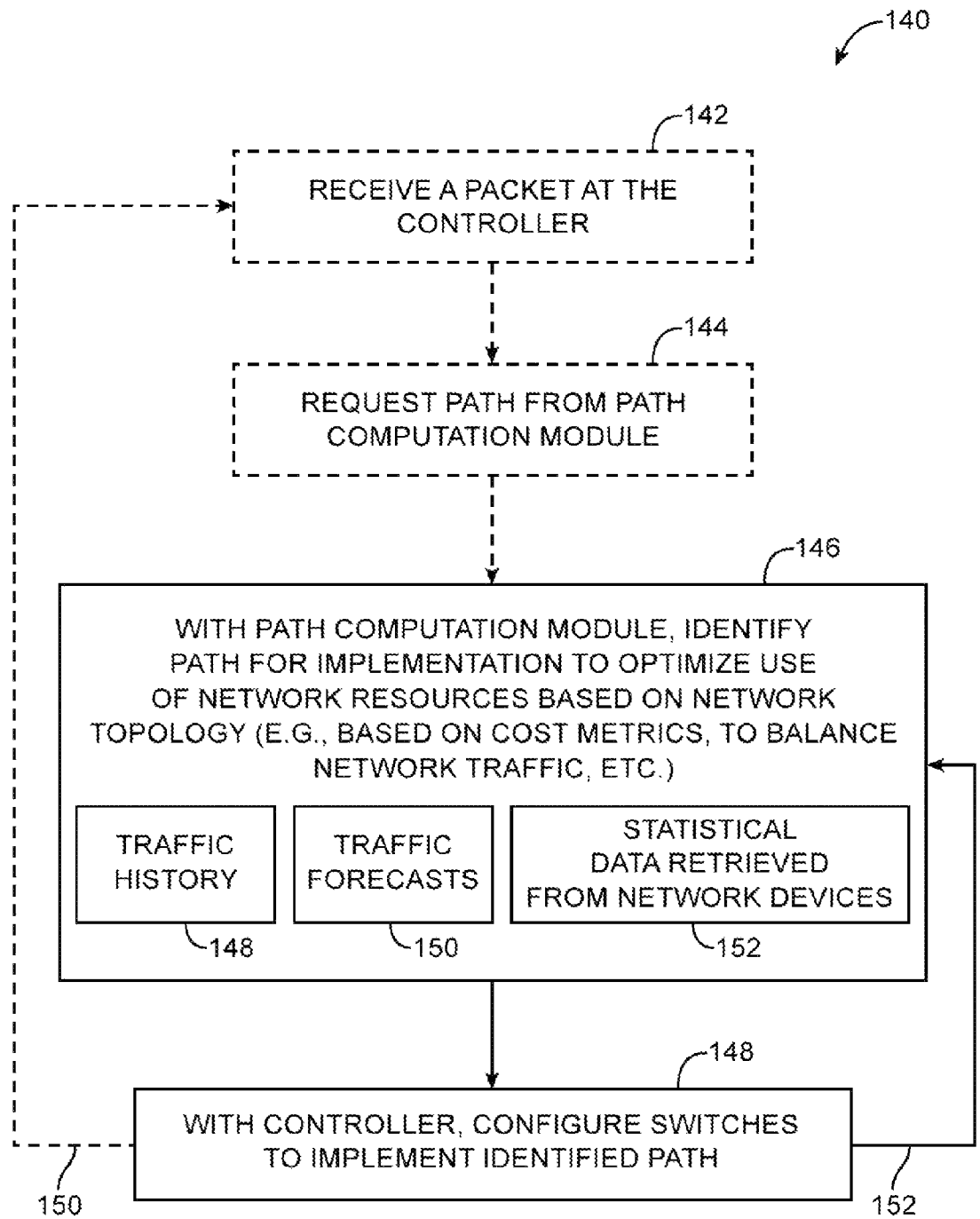
FIG. 10 is a flow chart of illustrative steps that may be performed to determine and implement network forwarding paths between routers via switches in a network in accordance with an embodiment of the present invention.

FIG. 10 is a flow chart 140 of illustrative steps that may be performed by controller 18 and path computation module 110 to implement network forwarding paths for efficient use of network resources.

During the operations of step 142, controller 18 may receive a network packet. The network packet may be received from a network source and may have been sent to a network destination (e.g., from a first core router to a second core router, from an aggregate router to a core router, from an aggregate router to another aggregate router, etc.). During step 144, controller 18 may request a path for the network packet from path computation module 110.

During the operations of step 146, path computation module 110 may identify a network forwarding path for implementation. The network forwarding path may be identified so that use of network resources is optimized. For example, computation module 110 may retrieve network topology information from storage 102 of controller 18 and determine a network forwarding path based on the network topology information. The network forwarding path may be determined for efficient use of available bandwidth, minimal path latency, minimal path length, or other desired cost metrics.

Computation module 110 may use network information such as network traffic history 148, traffic forecasts 150, statistical data 152 retrieved from network devices, or information on other network traffic conditions to determine the network forwarding path. Computation module 110 may identify a path so that network traffic is load balanced (e.g., balanced among network protocol interfaces of routers). Network traffic history 148 may include network traffic information collected by controller 18 over any desired duration of time (e.g., seconds, minutes, hours, days, or longer). Traffic forecasts 150 may be generated by path computation module 110 and may include estimates of how much and at what time future network traffic will be forwarded between network source and destinations. Statistical data 152 retrieved from network devices may include current and recent network traffic conditions at device-level granularity. For example, statistical data 152 may include current loading conditions at each port of a client switch (e.g., how much network traffic is flowing through the ports).

Path computation module may provide the identified network forwarding path to controller 18. During step 148, controller 18 may configure client switches in network 100 to implement the identified path (e.g., by providing the client switches with flow table entries such as shown in FIG. 9).

Steps 142 and 144 of FIG. 10 may be performed in scenarios in which path computation module 110 is configured for reactive path computation (e.g., because step 146 is performed in response to a request from controller 18). In this scenario, the process of flowchart 140 may return to step 142 via path 152. If desired, steps 142 and 144 may be omitted. For example, path computation module 110 may be configured for active path computation in which path computation module 110 actively identifies to controller 18 which network forwarding paths should be implemented (e.g., without requests from controller 18). In this scenario, the process of flow chart 140 may return to step 146 via path 152. If desired, active and reactive path computation may be performed simultaneously.

Figure 11:
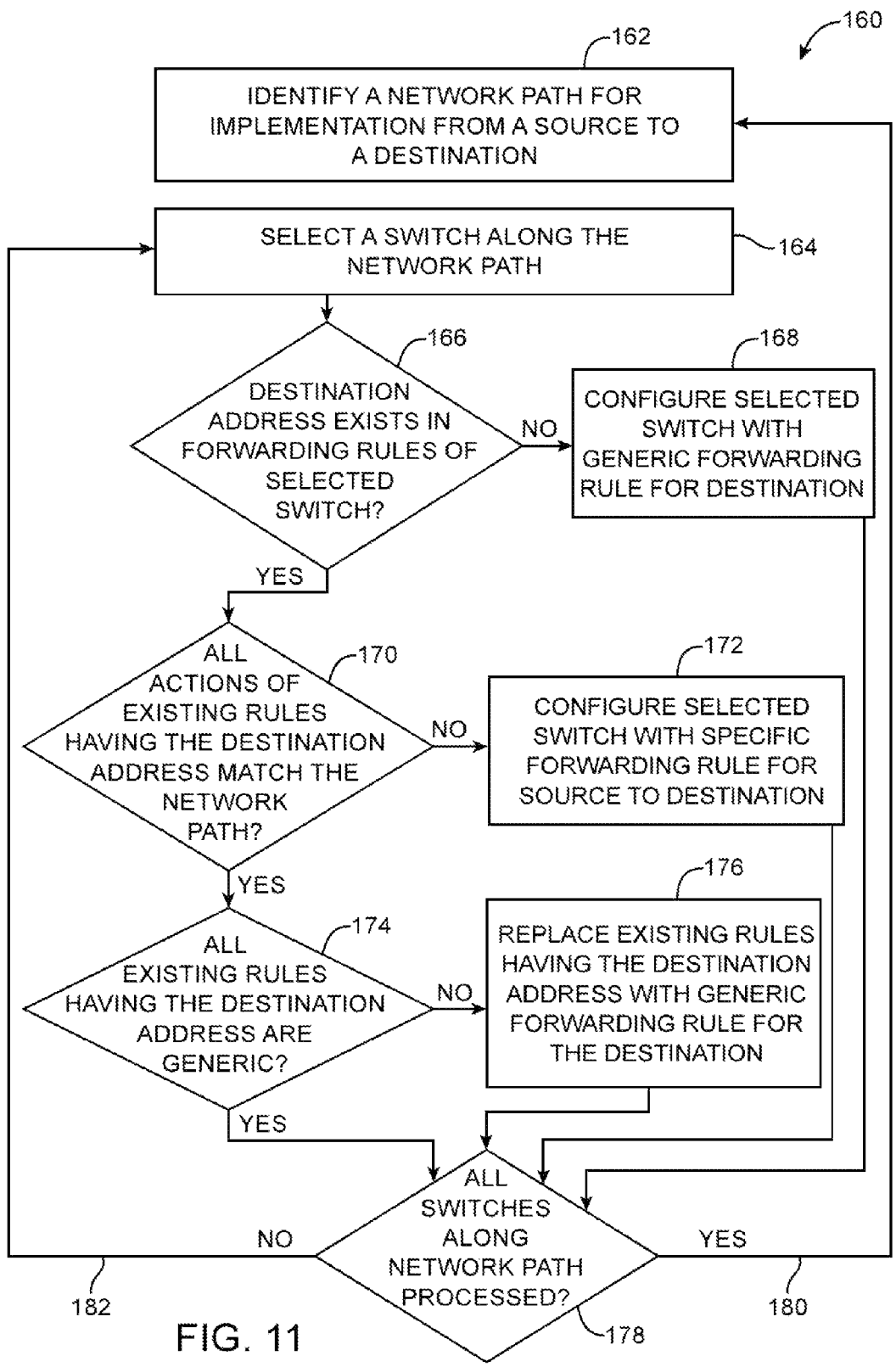
FIG. 11 is a flow chart of illustrative steps that may be performed by a controller to implement a forwarding path via switches in a network in accordance with an embodiment of the present invention.

FIG. 11 is a flow chart 160 of illustrative steps that may be performed by controller 18 to implement a network forwarding path. The steps of flow chart 160 may, for example, be performed during step 148 of FIG. 10.

During step 162, controller 18 may identify a network path for implementation. The network forwarding path may serve to connect a network source to a network destination. Controller 18 may receive information identifying the network path from a path computation module (e.g., a path computation module at controller 18 or implemented on remote computing equipment).

During step 164, controller 18 may select a switch along the network path (e.g., a switch along the network path that has not yet been configured to implement the network path).

During step 166, controller 18 may determine whether the destination address of the network destination exists in the forwarding rules of the selected switch. For example, controller 18 may determine whether the destination address is included in destination Ethernet address fields of the flow table entries of flow table 130. In response to determining that the destination address is absent from the forwarding rules of the selected switch, controller 18 may perform the operations of step 168. In response to determining that the destination address is included in the forwarding rules of the selected switch (e.g., the destination address exists in a destination Ethernet address field of one or more of the flow table entries for the selected switch), controller 18 may perform the operations of step 170.

During step 168, controller 18 may configure the selected switch with a generic forwarding rule for the network destination. The generic forwarding rule may direct the selected switch to forward all network packets that are destined for the network destination along the identified network path (e.g., regardless of network source). As an example, flow table entry 132 may be provided to client switch C2 to implement a network forwarding path through client switch C2 from all network sources to core router CR1.

During step 170, controller 18 may identify existing forwarding rules of the selected switch that include the destination address (e.g., flow table entries that include the destination address in destination Ethernet address fields). Controller 18 may determine whether the actions of the identified forwarding rules match the network path to be implemented. In response to determining that the actions of the identified forwarding rules fail to match the network path to be implemented, the operations of step 172 may be performed. In response to determining that the actions of the identified forwarding rules match the network path, the operations of step 174 may be performed.

Consider the scenario in which a first existing flow table entry directs client switch C2 to forward network packets from core router CR4 to core router CR5 via port P1 (e.g., flow table entry 134 of FIG. 9) and a second flow table entry directs client switch C2 to forward network packets from core router CR1 to core router CR5 via port P2 (e.g., flow table entry 136 of FIG. 9). In this scenario, when implementing a forwarding path from core router CR2 to core router CR5 through port P2 of switch C2, controller 18 may determine that the first flow table entry fails to match the forwarding path, because the first flow table entry forwards packets from a different port of switch C2 than the forwarding path to be implemented.

During the operations of step 172, controller 18 may configure the selected switch with a specific forwarding rule that routes network packets from the network source to the network destination. The specific forwarding path may identify both the network source and the network destination. For example, a flow table entry such as flow table entry 134 or 136 that identifies a network source via a source Ethernet address field and identifies a network destination via destination Ethernet address field may be provided to the selected switch in order to implement the network path.

During the operations of step 174, controller 18 may determine whether all existing rules having the destination address are generic forwarding rules (e.g., forwarding rules that match packets from any network source such as flow table entries with wildcarded source Ethernet address fields). In response to determining that all existing rules having the destination address are generic forwarding rules, the operations of step 178 may be performed. In response to determining that one or more of the existing rules having the destination address are specific rules (e.g., rules that match packets from specific network sources), controller 18 may perform the operations of step 176.

During the operations of step 176, controller 18 may replace the existing rules having the destination address with a generic forwarding rule for the destination. For example, controller 18 may merge the existing rules having the destination address into a single generic forwarding rule having the destination address. As another example, controller 18 may delete the existing rules having the destination address and add a new generic forwarding rule for the destination address. As an example, flow table entries 134 and 138 of FIG. 9 may be replaced with a generic flow table entry having a wildcarded source Ethernet address, destination Ethernet address ADR_CR5, and an action that directs client switch C2 to send matching network packets to port P2.

During the operations of step 178, controller 18 may determine whether all of the switches along the network path have been processed (e.g., whether the network path has been fully implemented by configuring each of the switches along the network path). If switches along the network path remain to be processed, the operations of step 164 may be performed to select remaining switches along the network path. If all of the switches along the network path have been processed (e.g., processed during steps 166-176), the process may return to step 162 to implement additional network forwarding paths.

Over time, the topology of networks such as network 100 may change. For example, network paths may fail due to physical damage (e.g., a fiber-optical cable may be cut or otherwise damaged), switch failure, or other sources of network failure. Network topology changes can potentially invalidate network forwarding paths. Consider the scenario in which a network path has been implemented between core routers CR1 and CR5 via client switches S1, C1, C2, and W1. If the network connection between client switch C1 and C2 fails (e.g., due to failure associated with client switch C1, client switch C2, a physical link between switches C1 and C2, etc.), then the network forwarding path between core routers CR1 and CR5 may also fail. Controller 18 may be configured to detect and accommodate changes in network topology so that invalid network forwarding paths are removed.

Figure 12:
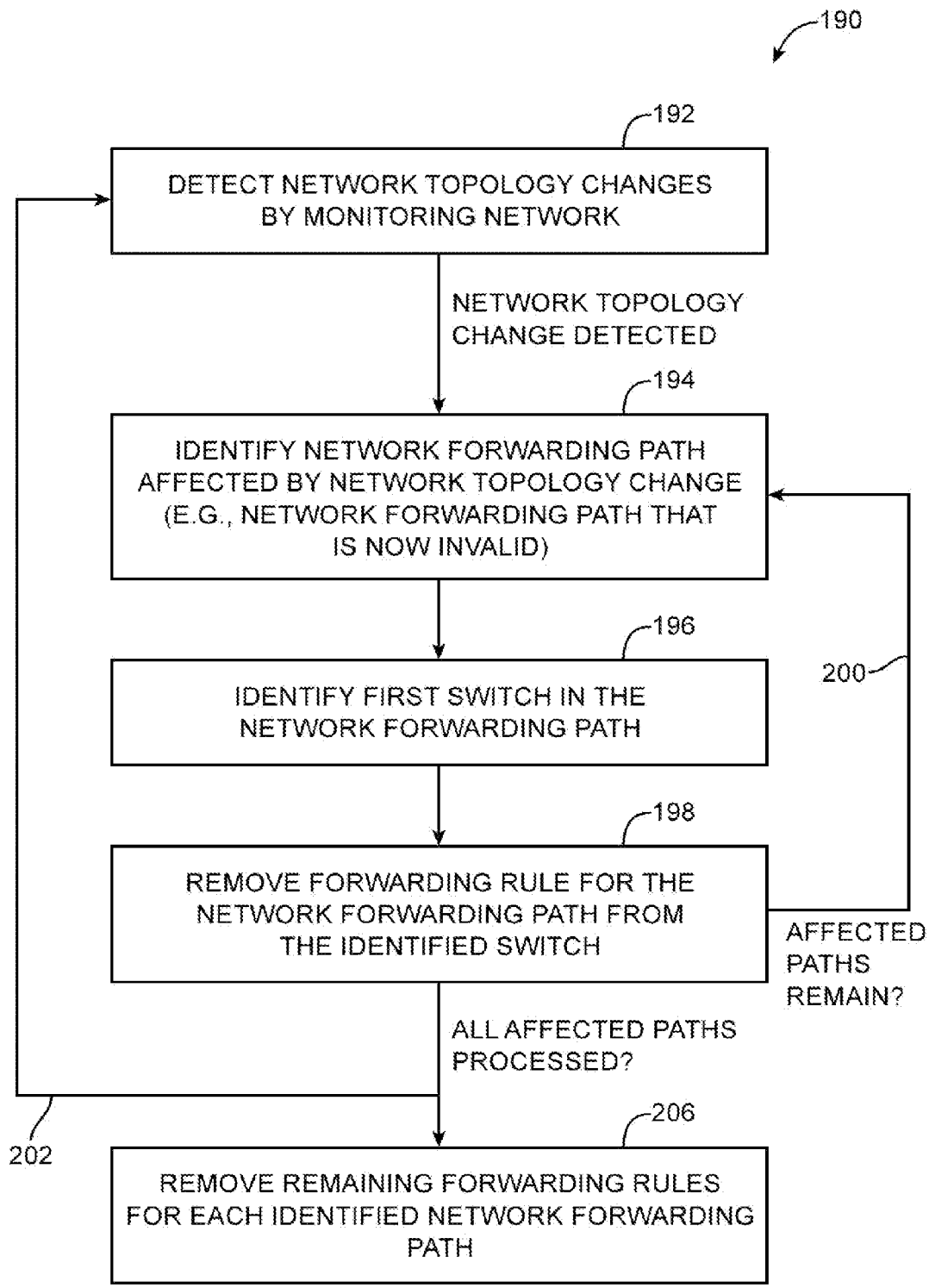
FIG. 12 is a flow chart of illustrative steps that may be performed by a controller to update forwarding paths in a network based on network topology changes in accordance with an embodiment of the present invention.

FIG. 12 is a flow chart 190 of illustrative steps that may be performed by controller 18 to accommodate changes in network topology for a network such as network 100.

During the operations of step 192, controller 18 may detect network topology changes by monitoring the network. Controller 18 may, for example, detect network topology changes based on network packets that have been forwarded to controller 18 by client switches or by actively monitoring the client switches (e.g., by communicating with the client switches to identify network connections between the client switches).

In response to detecting a change in the network topology, controller 18 may identify a network forwarding path that is affected by the detected network topology change during step 194. For example, controller 18 may identify a currently implemented network path that includes switches or network connections that are affected by the network topology change (e.g., switches or network connections that have failed). In other words, controller 18 may identify a currently implemented network forwarding path that is now invalid due to the network topology change.

During the operations of step 196, controller 18 may identify the first client switch in the network forwarding path. For example, switch S1 may be the first client switch of a network forwarding path from core router CR1 to core router CR2 that includes switches S1, S2, and S3.

During the operations of step 198, controller 18 may remove the forwarding rule that implements the network forwarding path for the identified switch. For example, controller 18 may delete a flow table entry corresponding to the network forwarding path. In this scenario, network packets that previously would have been forwarded along the forwarding path may instead be forwarded to controller 18, because the network packets do not match any flow table entries (e.g., step 84 of FIG. 7). Path computation module 110 may then be used to identify a new forwarding path for implementation based on the new network topology. Alternatively, the network packets may be forwarded along backup forwarding paths that have already been implemented at the identified switch (e.g., backup forwarding path 138 of FIG. 9 may be used by client switch C2 after forwarding path 136 is removed).

If forwarding paths that are affected by the network topology change remain to be processed, the process may return to step 194 to disable the remaining affected network forwarding paths. If all affected network paths have been processed, the operation may return to step 202 to detect and accommodate network topology changes.

By removing only the forwarding rule for the first switch along network forwarding paths that are affected by network topology changes, controller 18 may efficiently and quickly respond to network topology changes. Consider the scenario in which tens or hundreds of network forwarding paths are affected by a network topology change. In this scenario, controller 18 may avoid undesirable delay by disabling each of the network forwarding paths only at the initial (first) switches of each network forwarding path. The remaining forwarding rules associated with the disabled network forwarding paths may be removed during step 206 at a later time (e.g., after all detected network topology changes are accommodated by disabling affected network forwarding paths).

Core routers such as core routers CR1, CR2, etc. are typically implemented on complex switching and processing equipment in order to provide the core routers with the capability to forward and process large amounts of network traffic (e.g., network traffic associated with many aggregation routers and their corresponding networks). By forming networks such as network 100 with client switches interposed between aggregation routers, expensive core routers that are capable of handling both traffic forwarding and routing decisions may be replaced by a routing module that handles only routing decisions.

Figure 13:
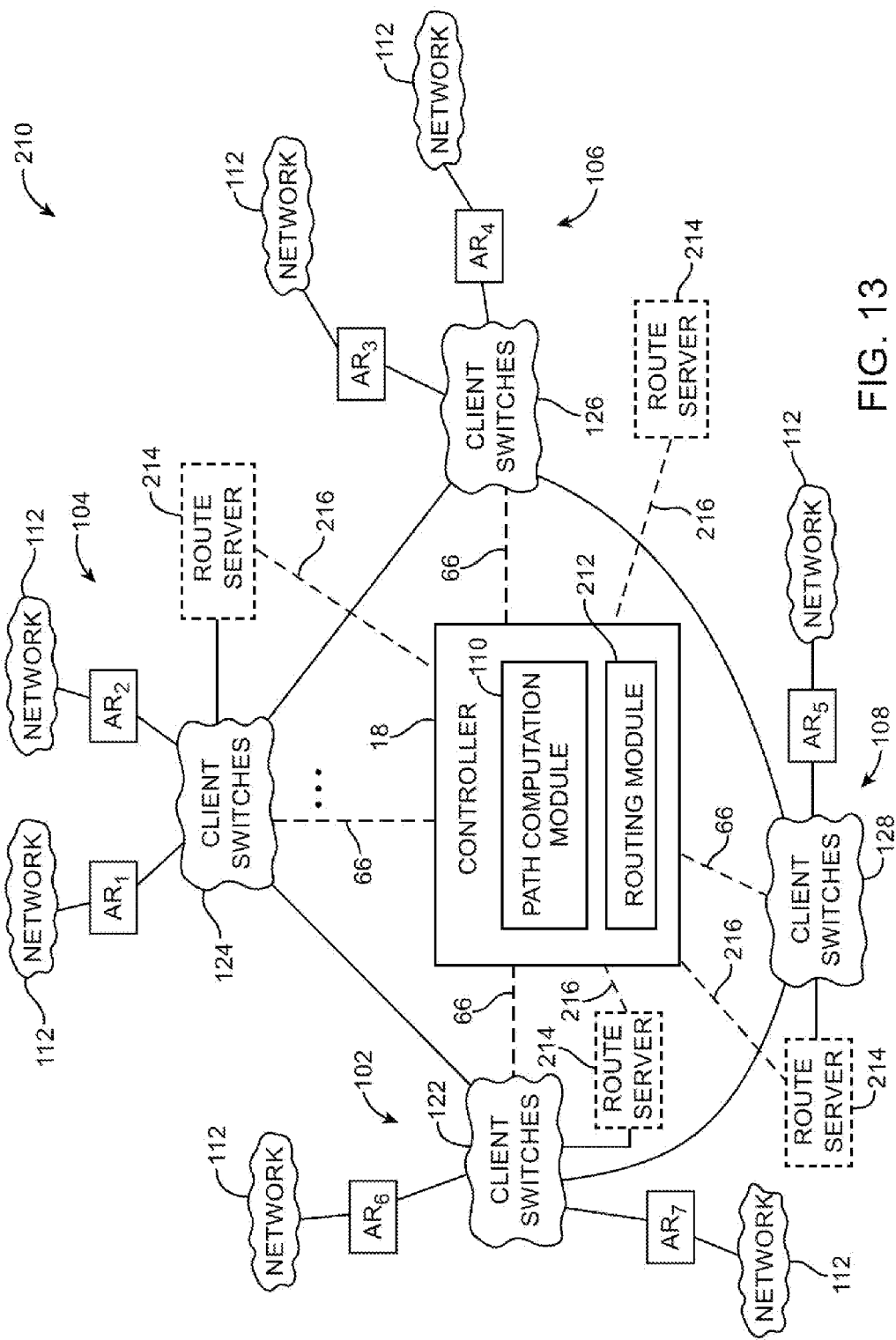
FIG. 13 is a diagram of an illustrative network that includes a core portions having routers and switches that are interposed between the routers and controlled by a controller having a routing module that communicates with the routers in accordance with an embodiment of the present invention.

FIG. 13 is an illustrative diagram of a network 210 in which a routing module 212 may serve to control network traffic flow between routers such as aggregation routers AR1, AR2, etc. Controller 18 may control groups of client switches that correspond to respective network regions. The group of client switches for a given network region may be interposed between aggregation routers of that network region.

Routing module 212 may be centralized (e.g., implemented at a controller server), may be distributed across multiple controllers, or may be distributed as multiple route servers 214. Each of route servers 214 may serve a corresponding network region. For example, a route server 214 may be included in each of regions 102, 104, 106, and 108.

During operation of network 210, aggregation routers may communicate to share routing information. The aggregation routers may use the routing information to help identify the network topology. For example, aggregation router AR1 may maintain information identifying routes to an associated network 112 and associated costs (e.g., costs associated with metrics such as path lengths, latency, etc.). In this scenario, aggregation router AR1 may share the route information to aggregation router AR2. Router AR2 may use the route information to determine that network packets destined for end hosts of network 112 of router AR1 should be routed to router AR1.

Routers may share route information over network 210 using network protocols such as the Border Gateway Protocol (BGP), the Open Shortest Path First (OSPF) protocol, the Intermediate System to Intermediate System (IS-IS) protocol, network protocols associated with the Protocol Independent Multicast (PIM) family, the Label Distribution Protocol (LDP), the Resource Reservation Protocol (RSVP), or other network protocols used to share network information (e.g., routing information or network topology information) between routers such as aggregation routers. Route information shared using the network protocols may include cost metrics associated with links in the network topology.

Figure 14:
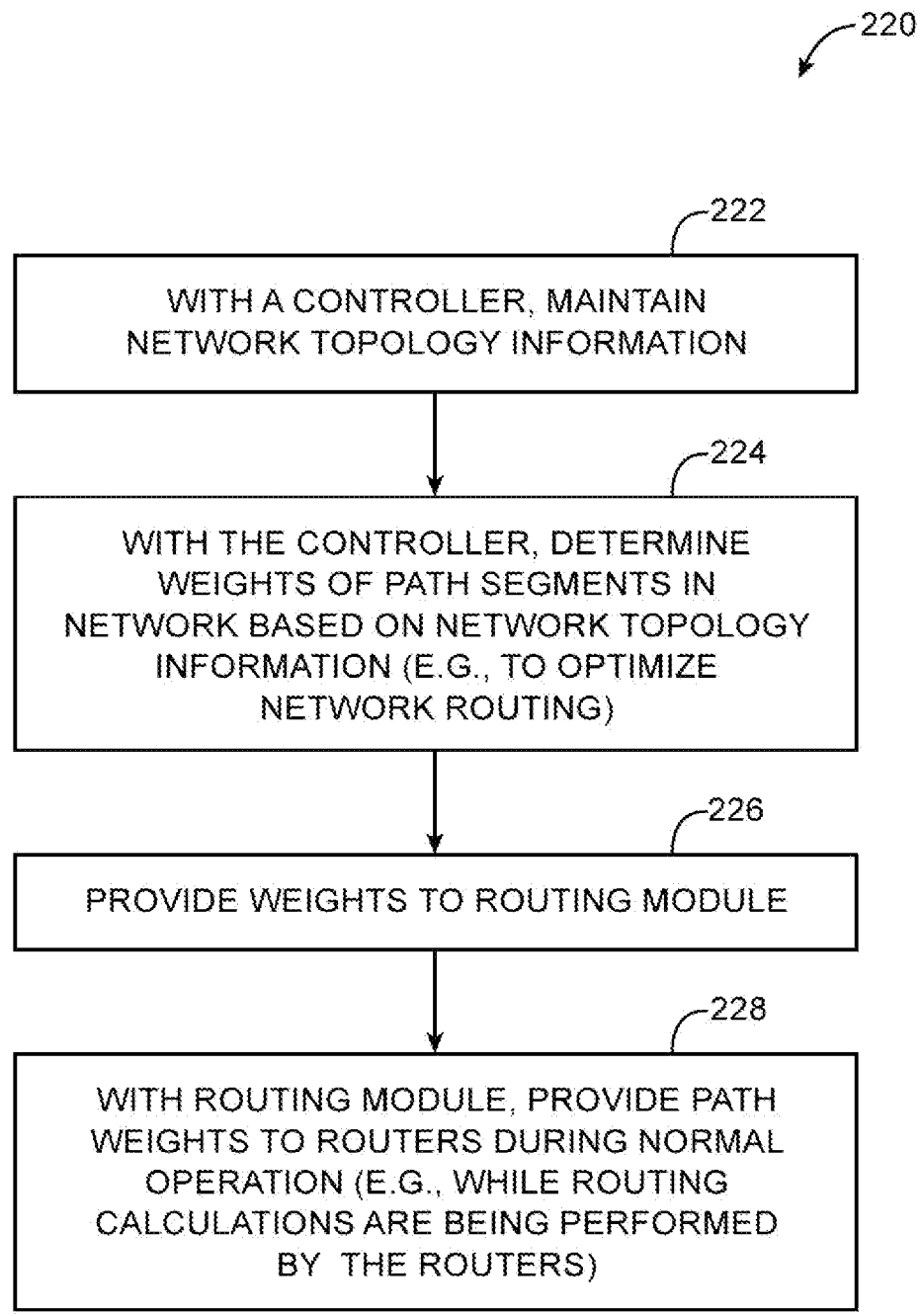
FIG. 14 is a flow chart of illustrative steps that may be performed to control routing of network traffic in accordance with an embodiment of the present invention.

Routing module 212 may communicate with routers such as aggregation routers AR1, AR2, AR3, AR4, etc. Routing module 212 may communicate with routers by sending and receiving network packets from the routers (e.g., routing module 212 may communicate using BGP, OSPF, etc.). Routing module 212 may provide route information to the routers based on network topology information maintained by controller 18. FIG. 14 is a flow chart 220 of illustrative steps that may be performed to provide route information to routers in a network such as network 210.

During the operations of step 222, controller 18 may maintain network topology information that identifies connections between client switches, routers, and other network devices.

During the operations of step 224, controller 18 may determine weights of path segments in the network based on the network topology information. Each path segment may include one or more network links (connections) between client switches or between client switches and routers. Controller 18 may be able to help optimize network routing, because controller 18 has a centralized view of network 210, whereas routers such as aggregate routers may only have access to partial information of the network 210. Controller 18 may determine the weights based on metrics such as cost metrics (e.g., metrics associated with path length, path latency, network traffic conditions, etc.). If desired, controller 18 may accommodate network topology changes by adjusting weights of path segments that are affected by the network topology changes. For example, the weight of a path segment that has failed may be adjusted so that network traffic is directed by the routers to avoid the failed path segment.

During step 226, controller 18 may provide the determined path segment weights to routing module 212. Subsequently, routing module 212 may provide the path segment weights to the routers during step 228. Routing module 212 may provide the path segment weights to the routers by communicating with the routers using any desired network protocol. The path segment weights may be provided to the routers while routing calculations are performed by the routers. The routers may use the path segment weights to determine how to route network packets.

If desired, the operations of flow chart 270 may be performed simultaneously with the steps of flow charts 140, 160, and 190. For example, the operations of flow chart 270 may be performed by a controller and a routing module to control how routers in a network direct network traffic, whereas the operations of flow chart 140 may be performed to control how client switches interposed between the routers forward the network traffic to network destinations that have been determined by the routers. By controlling network traffic routing at the routers and forwarding at the client switches, the controller may more efficiently control network traffic flow based on network resources and network topology information.

Routing module 212 may present itself to routers as a router, even though routing module 212 does not route any network traffic. In other words, data sent between end hosts of networks such as networks 212 are not forwarded through routing module 212. If desired, routing module 212 may be implemented using computing equipment that is separate from controller 18 (e.g., as one or more route servers 214).

Computing equipment used to form route servers 214 may provide only processing capabilities for communicating with routers (e.g., the computing equipment may be formed without network packet switching, forwarding, or routing capabilities). Implementing route servers 214 on computing equipment with only processing and communication capabilities may help to reduce cost, as network packet switching, forwarding, and routing circuitry tends to be complex and expensive.

In some scenarios, it may be challenging for routing module 212 (e.g., a routing module implemented at controller 18 or as one or more route servers) to present itself as a router. Some routers communicate using network protocols such as the Open Shortest Path First (OSPF) protocol that generally require data routing paths to correspond with protocol communication paths. It may be challenging for routing module 212 to accommodate such scenarios, because routing module 212 may be unable to handle network data traffic.

Figure 15:
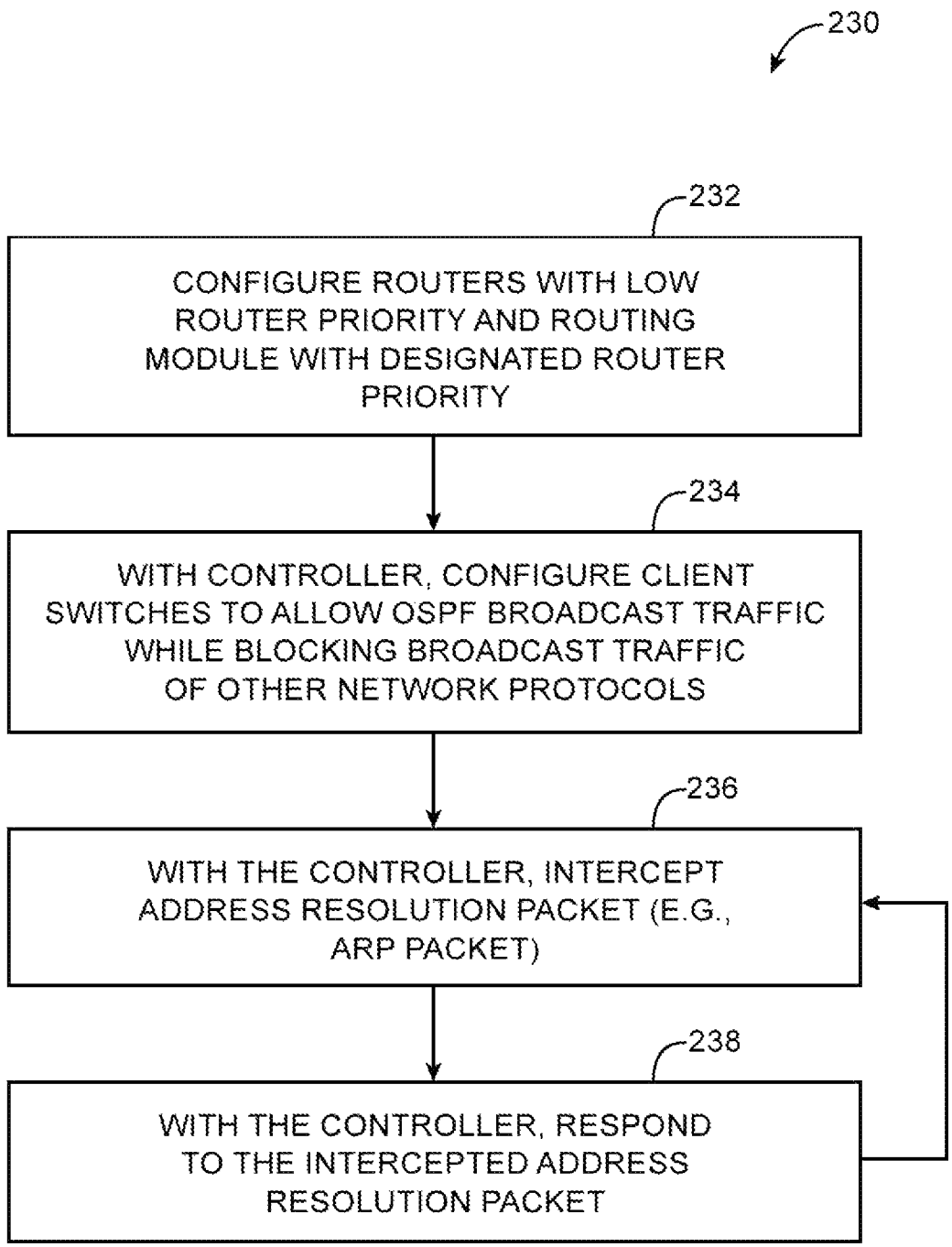
FIG. 15 is a flow chart of illustrative steps that may be performed to control routing of network traffic in accordance with an embodiment of the present invention.

FIG. 15 is a flow chart 230 of illustrative steps that may be performed to accommodate scenarios in which routing module 212 communicates with routers that normally require data routing paths to correspond with protocol communication paths. In the example of FIG. 15, the steps of flow chart 230 are described for the OSPF protocol. However, the steps of flow chart 230 may generally be performed for any desired protocol that normally requires data routing paths to correspond with protocol communication paths.

During the operations of step 232, routers that communicate with routing module 212 may be configured with a low OSPF priority, whereas routing module 212 may be configured with a designated router priority (e.g., a higher priority than the routers). Priority of the routers and routing module may, for example, be configured by a user such as a network administrator during network initialization and setup operations. During network protocol operations, routing module 212 may communicate the designed router priority to the routers, which directs the routers to use routing module 212 as a designated router. The routers may then provide and receive routing information from routing module 212 without requiring that network data traffic be forwarded along network paths between the routers and routing module 212.

During the operations of step 234, controller 18 may configure the client switches to allow certain types of broadcast traffic (e.g. routing protocol broadcast or multicast traffic such as OSPF multicast traffic) traffic while blocking broadcast traffic of other network protocols. Controller 18 may block broadcast traffic that uses address resolution protocols such as the Address Resolution Protocol (ARP). Client switches that receive broadcast and/or multicast network packets of non-desired protocols such as the OSPF protocol may be configured (e.g., via forwarding rules provided to the client switches) to forward the non-desired broadcast network packets to controller 18. Controller 18 may block the non-desired broadcast network packets by dropping the network packets. If desired, controller 18 may provide forwarding rules to the client switches that direct the client switches to identify and drop the non-desired broadcast network packets. For example, flow table entries that match broadcast network packets and non-OSPF network protocols may be provided to the client switches (e.g., so that broadcast network packets received using the OSPF network protocol do not match any flow table entries and are forwarded to controller 18).

ARP broadcast traffic may be sent by routers or other network devices to identify Ethernet address information that corresponds to a specified IP address (e.g., router AR6 may flood the network with an ARP broadcast packet to identify the Ethernet address of router AR3). During the operations of step 236, controller 18 may intercept address resolution packets such as ARP broadcast network packets. Controller 18 may intercept address resolution packets by directing the client switches to identify and forward the address resolution packets to controller 18 (e.g., by providing appropriate flow table entries to the client switches).

During the operations of step 238, controller 18 may respond to the intercepted address resolution packets by providing the address information requested by the address resolution packets. Controller 18 may maintain the address information of network devices in a database or other data structure. The address information may be stored at controller 18 (e.g., at storage 102 of FIG. 8). By intercepting and responding to address resolution packets, controller 18 may help to reduce unnecessary broadcasting of network packets, which tends to reduce processing load at client switches of the network.

The foregoing is merely illustrative of the principles of this invention and various modifications can be made by those skilled in the art without departing from the scope and spirit of the invention.

What is claimed is:

1. A method of operating a network having a core portion and peripheral portions, wherein the core portion of the network includes routers and switches interposed between the routers and wherein the switches are controlled by a controller, the method comprising:

with the controller, determining a forwarding path from a first router to a second router through the switches based on network traffic conditions; and with the controller, controlling the switches to implement the forwarding path from the first router to the second router by providing flow table entries to the switches via control paths coupled between the switches and the controller, wherein each of the switches has a corresponding set of forwarding rules that controls how that switch forwards network traffic, each of the forwarding rules includes source and destination address fields and an action to be performed in response to matching a network packet to the source and destination address fields, the routers have corresponding addresses, and controlling the switches to implement the forwarding path from the first router to the second router comprises:

selecting a switch included in the forwarding path;

determining whether the address of the second router matches the destination address fields of the forwarding rules of the set that corresponds to the selected switch; and in response to determining that the address of the second router fails to match any of the destination address fields of the set of forwarding rules that corresponds to the selected switch, configuring the selected switch with a generic forwarding rule that matches network packets sent to the second router.

2. The method defined in claim 1 wherein determining the forwarding path from the first router to the second router through the switches based on the network traffic conditions comprises:

determining the forwarding path from the first router to the second router through the switches based on network traffic conditions selected from the group consisting of: current network traffic conditions, historical network traffic conditions, and estimated network traffic forecasts.

3. The method defined in claim 1 wherein controlling the switches to implement the forwarding path from the first router to the second router further comprises:

in response to determining that the address of the second router matches at least one of the destination address fields of the set of forwarding rules that corresponds to the selected switch, configuring the selected switch with a specific forwarding rule that only matches network packets sent to the second router from the first router.

4. The method defined in claim 3 further comprising:

with the controller, merging specific forwarding rules to form generic forwarding rules.

5. A method of operating a network having network routers that each serve a respective portion of the network and switches interposed between the network routers, wherein the switches are controlled by a controller, wherein the network routers determine routing paths between the portions of the network by communicating using a network protocol, the method comprising:

with the controller, maintaining network topology information;

with the controller, determining weights of path segments in the network based on the network topology information;

with a routing module, providing the path weights to the network routers using the network protocol, wherein the network routers have respective addresses;

with the controller, maintaining address information identifying the address of each of the network routers;

with the controller, intercepting address resolution packets sent from the network routers; and with the controller, responding to the address resolution packets using the maintained address information.

6. The method defined in claim 5 wherein the routing module is implemented at the controller and wherein providing the path weights to the network routers using the network protocol comprises:

with the controller, communicating with the network routers using the network protocol.

7. The method defined in claim 5 wherein the routing module is implemented with at least one route server that is coupled to the switches and wherein providing the path weights to the network routers using the network protocol comprises:

with the route server, communicating with the network routers using the network protocol.

8. The method defined in claim 5 wherein the network protocol comprises the Open Shortest Path First protocol, wherein the routers are configured with a low router priority and wherein the routing module is configured with a designated router priority, the method further comprising:

with the controller, configuring the switches to allow broadcast traffic associated with the Open Shortest Path First protocol.

9. The method defined in claim 8 further comprising:

with the controller, blocking broadcast network traffic that is not associated with the Open Shortest Path First protocol.

\* \* \* \* \*